United States Patent [19]
Cheatum

[11] 3,931,760
[45] Jan. 13, 1976

[54] BALE LENGTH CONTROL MECHANISM

[75] Inventor: Leo George Cheatum, Ottumwa, Iowa

[73] Assignee: Deere & Company, Moline, Ill.

[22] Filed: Mar. 3, 1975

[21] Appl. No.: 554,637

[52] U.S. Cl. .................................................. 100/4
[51] Int. Cl.² ........................................ B65B 13/18
[58] Field of Search ...................... 100/4, 20, 21, 22

[56] References Cited
UNITED STATES PATENTS

| | | | |
|---|---|---|---|
| 2,790,336 | 4/1957 | Bornzin | 100/4 X |
| 2,897,748 | 8/1959 | Nolt et al. | 100/4 |
| 2,988,115 | 6/1961 | Cheatum | 100/21 X |
| 3,195,443 | 7/1965 | Hollyday | 100/4 |
| 3,221,639 | 12/1965 | Rimmey | 100/4 |
| 3,371,596 | 3/1968 | Nelson | 100/4 |

*Primary Examiner*—Billy J. Wilhite

[57] ABSTRACT

A bale tying mechanism is driven through a clutch that is controlled by a trip mechanism that actuates the clutch when the bale reaches a certain size. The trip mechanism includes a trip arm that swings between a stop position, that is established by an adjustable stop on the trip arm, and an upward, trip position, wherein it causes engagement of the clutch and the actuation of the tying mechanism. The arm drops from its trip position to its stop position after engagement of the clutch and is swung upwardly from the stop position to the trip position for engagement by a wheel that is rotated in response to increasing length of a bale, the wheel disengaging the arm initially after the trip arm causes the actuation of the clutch to permit the arm to drop against the stop. A latching device is provided between the wheel and the stop to prevent the arm from bouncing off the stop until it is engaged by the wheel.

4 Claims, 2 Drawing Figures

BALE LENGTH CONTROL MECHANISM

BACKGROUND OF THE INVENTION

This invention relates to an agricultural harvesting machine for baling hay or the like, and more particularly to a control mechanism for actuating a bale tying mechanism and controling the length of the bale.

An agricultural baler conventionally includes a mechanism for tying a bale with either twine or wire after the bale has reached a predetermined length, after which the bale is discharged from the baler. The tying mechanism is conventionally driven at appropriate intervals through aa single revolution clutch, that is engaged by actuation of a tripping device responsive to the length of the bale. Most current balers utilize similar tripping devices that measure the length of the bale and actuate the clutch when the bale reaches the predetermined size, the original tripping mechanism of this type being developed in Germany and being widely used because of its simplicity. U.S. Pat. No. 2,988,115 shows a bale tying mechanism and tripping device of the above general type, and U.S. Pat. No. 3,371,596 also discloses a tripping mechanism of the above type.

Generally said tripping devices utilize a vertically swingable trip arm that is swung upwardly by engagement with a wheel that is driven by a bale measuring wheel that rotates as the bale increases in length. When the arm reaches its tripping position, it permits the actuation of a clutch, that in turn actuates the tying mechanism. After the clutch is actuated, means are provided for moving the wheel out of engagement with the arm, which permits the trip arm to fall until a stop on the trip arm engages the wheel, following which the wheel again engages the arm to raise the arm and repeat the cycle for another bale. Conventionally the stop on the arm is adjustable to vary the distance that the trip arm has to be swung before it again actuates the clutch and to consequently vary the length of the bale.

One problem with the above devices resides in the fact that as the trip arm falls against the stop, the natural resilience of the parts causes the arm to bounce, and if the wheel again engages the arm while the arm has bounced off the wheel, the next bale will be shorter in length since the arm will not have to travel so far before it again reaches the trip position. Also, the fields in which the balers are operated are generally relatively rough, and the roughness is compounded by the increasing speed at which the balers are operated, so that the entire machine is frequently bouncing, which causes the trip arm to bounce on the stop when it is free of the wheel. Thus, if the baler strikes a substantial hole or a bump while the trip arm is free of the wheel, it is possible that the wheel will engage the arm a substantial distance away from the stop, again causing the next bale to be substantially shorter. The resulting irregular bale lengths has presented more of a problem recently with the increasing use of automatic bale handling machines, which require a relatively uniform bale size.

SUMMARY OF THE INVENTION

According to the present invention, there is provided an improved trip mechanism for controlling the length of a bale on an agricultural harvesting machine. More specifically, there is provided an improved tripping mechanism of the above general type, the improvement residing in the provision of means for eliminating the bouncing of the trip arm when the arm is free of the drive wheel.

Still more specifically, a latching device is provided for releaseably holding the trip arm in its lowermost or stop position when the trip arm is free of the drive wheel, so that the arm does not bounce away from its stop position.

An important feature of the invention resides in the durability and simplicity of the anti-bounce device and in the adaptability of the anti-bounce device to present bale tying control systems.

DESCRIPTION OF THE PREFERRED EMBODIMENT

Figure 1:
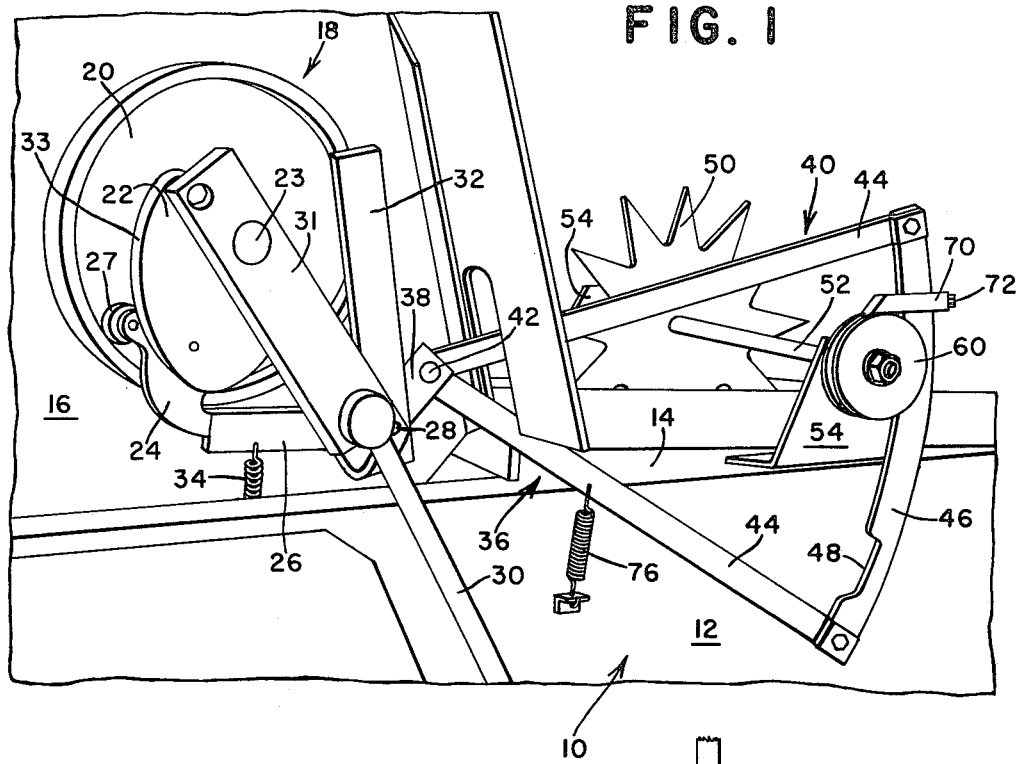
FIG. 1 is a perspective view of the left side of a baler at the rearward end of the bale case showing the clutch for actuating the tying mechanism and the tripping mechanism for controling the clutch.

The invention is embodied in an agricultural baler having a fore and aft bale case 10, only a portion of which is shown in FIG. 1. The bale case has an upright side wall 12 and a horizontal top 14. As is well known, the bale case has a rectangular cross section, and a bale is formed in the bale case by a reciprocating plunger which compresses successive charges of hay or the like into a bale, which moves rearwardly in the bale case as it is being formed. Upon completion of the bale, it is tied by means of a tying mechanism, which ties a knot in strands of twine that are wrapped around the bale in a twine type baler, or twist the ends of wires together that are wrapped around the bale in a wire type baler. A tying mechanism of the latter type is disclosed in U.S. Pat. No. 2,988,115, which is also assigned to the assignee herein, while a twine type tying mechanism is shown in U.S. Pat. No. 2,926,599, also assigned to the assignee herein. The tying mechanism is conventionally mounted above the bale case 10 inwardly of a vertical wall 16 which extends upwardly from the side wall 12 of the bale case.

The tying mechanism is actuated when the bale reaches a predetermined size and is conventionally driven at the appropriate intervals through an intermittently actuated clutch 18. The clutch 18 includes a drive member 20 and a driven member 22 having a transverse shaft 23. The operation of such a clutch is described in greater detail in U.S. Pat. No. 3,303,913 also assigned to the assignee herein, and, as is well known, the shaft 23, which is connected to the tying mechanism, is driven through a single revolution when the clutch is engaged. The clutch is automatically disengaged after the single revolution is completed, the single revolution of the drive shaft 23 driving the tying mechanism through its entire tying cycle. As is well known, the drive member 20 is constantly driven through some type of a driving arrangement on its outer periphery, such as a gear train or a chain drive (not shown) and is engaged when a pawl 24, which is pivotally mounted on the driven member 22, is allowed to swing into engagement with the drive member 20, a trip dog 26 swinging away from the pawl to allow a roller 27 on the pawl to engage a projection or lug (not shown) on the drive member 20. The trip dog 26 is swingable on a transverse rockshaft 28, that is partially obscured behind a lift link 30 connected to a crank arm 31, which in turn is driven by the driven member 22, the lift link being connected to a needle frame (not shown) that is also part of the tying mechanism as is well known. The trip dog is rigid with the rockshaft 28, and also rigid with the rockshaft 28 is a release lever 32, that is actuated by a cam surface 33 on the outer periphery of the driven member 22.

The trip dog is biased downwardly by a spring 34, and the position of the trip dog is controlled by a trip mechanism, indicated in its entirety by the numeral 36. The trip mechanism includes a trip lever 38 that is also rigid with the rockshaft 28, and the clutch is actuated by counterclockwise movement of the lever 38, which swings the trip dog 26 downwardly so that the pawl 24 is free to swing into engagement with the drive member 20. As the driven member 22 then rotates, the cam surface 33 engages the release lever 32 to rotate the rockshaft 28 in a clockwise direction, moving the trip dog 26 upwardly into the position shown in FIG. 1, where it again engages the pawl to swing the pawl out of engagement with the drive member.

The above movement of the trip lever 38 is controlled by a trip arm, which is indicated in its entirety by the numeral 40 and is pivotally connected to the lever 38 by a transverse pivot 42. The trip arm 40 is in the form of a segment of a circle and has a pair of arms or members 44 extending radially from the pivot 42, the outer ends of the members 44 being connected to the top and bottom of an arcuate track 46 that is concentric with the pivot 42. The track 46 has a notch 48 on its inner surface adjacent to the lower end of the track.

A star type wheel 50 is mounted on a transverse shaft 52, that is journaled in a pair of support brackets 54 attached to the bale case top 14 adjacent the opposite sides of the bale case, the lower portion of the star wheel 50 extending into the bale chamber and engaging a bale moving rearwardly in the bale case, so that rearward movement of the bale causes rotation of the shaft 52. Mounted on the outer end of the shaft 52 exteriorally of the left hand bracket 54 and in general fore and aft alignment with the trip arm 40, is a wheel 56 that is provided with an aggressive outer surface. The wheel is mounted adjacent to a sleeve 58 on the shaft 52, and an annular outer disk 60 is mounted on the shaft 52 on the exterior side of the wheel 56, while an annular inner disk 62 is mounted on the sleeve 58 on the inner side of the wheel 56. The sleeve 58, the wheel 56, and the outer disk 60 are clamped onto the shaft 52 by means of a nut 64 threadable on the end of the shaft. The inner disk 62 is axially shiftable on the sleeve 58 and is biased against the wheel 56 by a compression spring 66 mounted around the sleeve 58 between the inner disk and an adjustable abutment 68, that is threadable on the sleeve 58 to adjust the force exerted by the spring 66 on the inner disk 62. As is apparent, the wheel 56 has substantially the same thickness as the track 46 and is engageable with the inside of the track with the opposite disks 60 and 62 disposed on opposite sides of the track.

Figure 2:
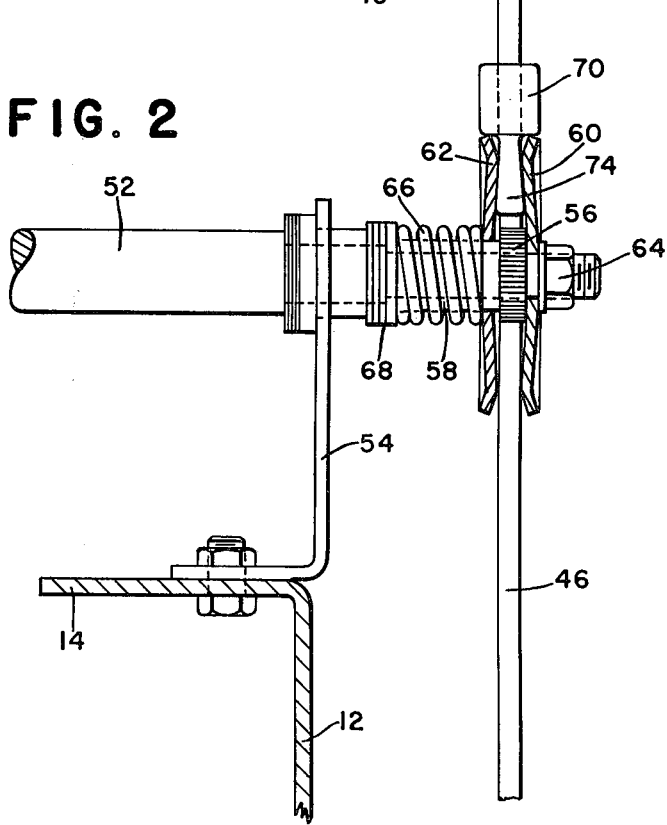
FIG. 2 is an enlarged vertical section looking rearwardly along the baler and showing the adjustable stop on the tripping mechanism and the anti-bounce mechanism for the trip arm.

An adjustable stop 70 is mounted on the track 46, the stop being provided with a slotted opening conforming to the cross section of the track and being slidable along the track. A set screw 72 is threadable through the stop 70 to lock the stop at the selected position along the track. The stop is provided with a downwardly extending tang or projection 74 that is aligned with the track and wheel 56 and is insertable between the opposite disks 60 and 62 when the outer periphery of the disks engage the stop 70, as shown in FIG. 2. The tang 74 has a somewhat trapezoidal cross section and is slightly wider at the bottom, as is apparent from FIG. 2, and before the disks engage the stop, the tang 74 is inserted between the opposite disk, the inner disk 62 deflecting against the bias of the spring 66 to permit the entry of the tang. As is apparent, the spring loaded disk 62 acts as a releasable latch to hold the stop against the wheel disk 60 and 62 until a sufficient separating force is supplied between the stop and the wheel disk to cause the inner disk to deflect the spring a sufficient amount for the removal of the tang 74. A spring 76 can be provided between the trip arm 40 and a mounting bracket on the side of the bale case to bias the trip arm 40 downwardly.

In operation, the aggressive wheel 56 normally engages the inside of the track 46, and as the bale is being formed in the bale case and moves rearwardly therein, the star wheel 50 rotates, which rotates the wheel 56 and drives the trip arm 40 upwardly about its pivot 42. When the trip arm 40 rotates upwardly to a point where the notch 48 is opposite the wheel 56, the entire trip arm 40 swings forwardly (to the left in FIG. 1), the lever 38 also swinging forwardly in a counterclockwise direction about the rockshaft 28, which causes the trip dog 26 to swing downwardly. The spring 34 exerts a downward force on the trip dog 26 that causes the forward movement of the trip arm 40, and, as previously described, when the trip dog 26 clears the pawl 24, the clutch 18 engages.

As the driven member 22 rotates, the cam surface 33 engages the release lever 32 to rock the release lever 32 and the rockshaft 28 in a clockwise direction. The clockwise rocking of the rockshaft 28 also rocks the lever 38 to shift the trip arm 40 rearwardly, so that the track 46 separates from the wheel 56. Whereupon, the weight of the trip arm 40 causes the arm to drop until the stop 70 engages the wheel disks 60 and 62. The spring 76 is an optional attachment to assist the dropping of the trip arm once it is released from the wheel. As the trip arm drops, the tang 74 moves between the wheel disks 60 and 62, which separate and clamp the tang between the opposite disk as previously described. The spring 66 is provided with sufficient compression to securely clamp or latch the tang 74 and thereby prevents the lift arm from bouncing off the wheel disk once the stop 70 engages the wheel disk.

As the driven member 22 of the clutch rotates further, the cam surface 33 clears the release lever 32, which permits the spring 34 to pull the clutch dog 26 downwardly. The consequent counterclockwise rotation of the rockshaft 28 swings the lever 38 forwardly, and consequently pulls the trip arm 40 forwardly, so that the inner surface of the track 46 again engages the wheel 56. The wheel 56 then drives the trip arm 40 upwardly about the pivot 42 in response to rotation of the star wheel 50, which, of course, is rotated by the rearward movement of the bale as it is being formed in the bale case.

The distance between the stop 70 and the notch 48 controls how long the star wheel will rotate before the trip arm is again tripped to actuate the clutch 18 and consequently controls the length of the bale, and, as is apparent, adjustment of the stop 70 along the track 46 varies the length of the bale. The latching device provided by the clamping of the tang 74 between the two wheel disks 60 and 62 prevents the trip arm from bouncing away from the wheel disk until the drive wheel 56 positively drives the trip arm upwardly to separate the tang 74 from the wheel disk. Thus, the wheel 56 begins its engagement with the track 46 only when the stop 70 is in engagement with the wheel disk and not when the stop is off the wheel disk as a result of vertical bouncing of the trip arm 40, so that the star wheel must travel the same distance between each cycle to provide a uniform bale length.

I claim:

1. In a baler having a tying mechanism actuated by a trip device that includes a rotary bale engaging element adapted to rotate a shaft in response to increasing bale length, a trip arm swingable between a lower stop position and an upper trip position wherein it actuates the tying mechanism, and including an arcuate track, having a stop mounted thereon to establish the stop position, and a wheel means operatively connected to the shaft and rotated thereby and engageable with the track to swing the trip arm upwardly to its trip position and disengagable therefrom to permit the trip arm to drop to its stop position, the improvement comprising: latching means operatively associated with the arm for releasable holding the arm in its stop position until the wheel engages the track to prevent the arm from bouncing away from its stop position when the arm initially drops to said position.

2. The invention defined in claim 1 wherein the latching means includes a pair of disks overlapping the opposite sides of the track, the stop engaging the periphery of the disks to establish said stop position.

3. The invention defined in claim 2 wherein one of the disks is mounted on the wheel shaft for axial shifting relative to the opposite disk and the latching means includes a spring means biasing the shiftable disk toward the opposite disk and a tang mounted on the stop and movable between the opposite disks when the arm drops to its stop position to separate the disk against the bias of the spring means, the tang being clamped between the opposite disks to hold the arm in its stop position and being releasable therefrom when the upward driving force in the arm exceeds a predetermined amount.

4. The invention defined in claim 3 and including adjusting means operatively associated with the spring means for selectively adjusting the biasing force on the shiftable disks.

* * * * *